US012322271B2

(12) United States Patent
Mosisa et al.

(10) Patent No.: US 12,322,271 B2
(45) Date of Patent: Jun. 3, 2025

(54) DEVICE FOR NOTIFYING USER ABOUT MISSING ITEMS FROM A BAG

(71) Applicants: Lily Jebessa Mosisa, Yukon, OK (US); Caleb Ruger Crase, Piedmont, OK (US); Samuel Gibson Byrd, Yukon, OK (US); Travis Edward Lloyd, Yukon, OK (US); Sydnie Rayann Cox, Piedmont, OK (US); Heather Marie Brockway, Yukon, OK (US); Caleb Marvin Houston, Piedmont, OK (US); Logan Thomas Dennie, Yukon, OK (US); Anjalina Lisa Thomas, Yukon, OK (US); Joy Jebessa Mosisa, Yukon, OK (US)

(72) Inventors: Lily Jebessa Mosisa, Yukon, OK (US); Caleb Ruger Crase, Piedmont, OK (US); Samuel Gibson Byrd, Yukon, OK (US); Travis Edward Lloyd, Yukon, OK (US); Sydnie Rayann Cox, Piedmont, OK (US); Heather Marie Brockway, Yukon, OK (US); Caleb Marvin Houston, Piedmont, OK (US); Logan Thomas Dennie, Yukon, OK (US); Anjalina Lisa Thomas, Yukon, OK (US); Joy Jebessa Mosisa, Yukon, OK (US)

( * ) Notice: Subject to any disclaimer, the term of this patent is extended or adjusted under 35 U.S.C. 154(b) by 71 days.

(21) Appl. No.: 18/208,746

(22) Filed: Jun. 12, 2023

(65) Prior Publication Data

US 2024/0290194 A1    Aug. 29, 2024

Related U.S. Application Data

(60) Provisional application No. 63/447,861, filed on Feb. 23, 2023.

(51) Int. Cl.
G08B 21/24 (2006.01)
G01G 19/52 (2006.01)
G08B 7/06 (2006.01)

(52) U.S. Cl.
CPC ............. G08B 21/24 (2013.01); G01G 19/52 (2013.01); G08B 7/06 (2013.01)

(58) Field of Classification Search
CPC .......... G08B 21/24; G08B 7/06; G01G 19/52
See application file for complete search history.

(56) References Cited

U.S. PATENT DOCUMENTS 7,205,894 B1 * 4/2007 Savage .............. G08B 13/1427
340/568.1
9,888,756 B2 2/2018 Shah et al.
(Continued)

Primary Examiner — Thomas D Alunkal

(57) ABSTRACT

A method and system comprising a device coupled to bag containing a set of items includes measuring at a first time with a load cell a first weight of the set of items, storing the first weight as a calibrated weight, following a second time and after determining with a force-sensitive resistor that the bag is being worn by a user, measuring with the load cell a second weight of the set of items, storing the second weight as the measured weight, determining whether the measured weight is less than the calibrated weight, and, if so, notifying the user that at least one of the set of items is missing. A mobile device running bag application software coupled to the device may be further deployed to enhance the functionality described above by allowing the first and second times to be automatically updated from a class schedule.

15 Claims, 5 Drawing Sheets

(56) References Cited

U.S. PATENT DOCUMENTS

| | | | |
|---|---|---|---|
| 11,268,846 B1* | 3/2022 | Mayo | G01G 19/58 |
| 11,861,997 B2* | 1/2024 | Freedman | G06Q 20/208 |
| 2008/0083802 A1* | 4/2008 | Reziniano | A45C 13/28 |
| | | | 224/576 |
| 2015/0237980 A1* | 8/2015 | Shah | G01G 23/365 |
| | | | 340/568.1 |
| 2016/0161324 A1* | 6/2016 | Tse | G01G 19/58 |
| | | | 73/862.541 |
| 2022/0185437 A1* | 6/2022 | Myslinski | B63C 11/26 |

* cited by examiner

DEVICE FOR NOTIFYING USER ABOUT MISSING ITEMS FROM A BAG

TECHNICAL FIELD

This disclosure relates generally to a device, system and method for preventing the loss of items, and, more particularly, to a device, system, and method for notifying a user about missing items from a bag based on weight measurements.

BACKGROUND

A student's backpack or 'bag' represents their busy life. Essential items they carry with them are often a lifeline they need to navigate their mobile lives and successfully complete their daily tasks. Frustration results when items have been forgotten or missing, and can have a negative impact, especially on student academic performance, and add to the challenges they face every day. To address these issues, various methods for weighing luggage have been devised to detect differences in weight, such as when a change in weight has been detected after the bag has been moved. For a student, with a busy day and a class schedule that involves accessing their bag or backpack multiple times per day, with items being taken out and placed back in the bag, Prior solutions do not consider the various times throughout the day that items are removed from or placed back in the bag, therefore do not effectively meet the needs of students. Hence, there is a need for a device for bags that compares the current weight of a set of items in the bag with a calibrated weight according to various selected times throughout the day, allowing the device to operate with only minimum interaction from the user in order to provide alerts for missing items.

SUMMARY

In one general aspect, the instant application describes a method and system comprising a device coupled to a bag, the bag containing a set of items includes measuring at a first time with a load cell a first weight of the set of items, storing the first weight as a calibrated weight, and following a second time after determining with a force-sensitive resistor that the bag is being worn by a user, measuring with the load cell a second weight of the set of items, storing the second weight as the measured weight, determining whether the measured weight is less than the calibrated weight, and if so, notifying the user that at least one of the set of items is missing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well-known methods, procedures, components, and/or circuitry have been described at a relatively high-level, without detail, in order to avoid unnecessarily obscuring aspects of the present teachings.

Reliably detecting missing items from a bag such a student backpack is problematic. Students typically have a busy schedule throughout the day and access their bag to take items in and out at different times over the course of the day. Without considering the daily schedule, using weight measurements to detect when an item is missing would become error-prone and annoying to the user.

To address these issues, a device is provided that compares a current weight of a set of items in the bag with a calibrated weight according to various times throughout the day according to a schedule, allowing the device to operate with a minimum of interaction from the user in order to provide alerts for missing items.

The proposed invention is a device coupled to a bag, the bag containing a set of items, and includes the device measuring at a first time with a load cell a first weight of the set of items, storing the first weight as a calibrated weight, and following a second time after determining with a force-sensitive resistor that the bag is being worn by a user, measuring with the load cell a second weight of the set of items, storing the second weight as the measured weight, determining whether the measured weight is less than the calibrated weight, and if so, notifying the user that at least one of the set of items is missing.

As will be understood by persons of skill in the art upon reading this disclosure, benefits and advantages provided by such implementations can include, but are not limited to, a technical solution to the technical problems of providing a device for bags that compares a current weight of a set of items in the backpack with a calibrated weight according to various times throughout the day, allowing the device to operate with a minimum of interaction from the user in order to provide alerts for missing items.

Figure 1:
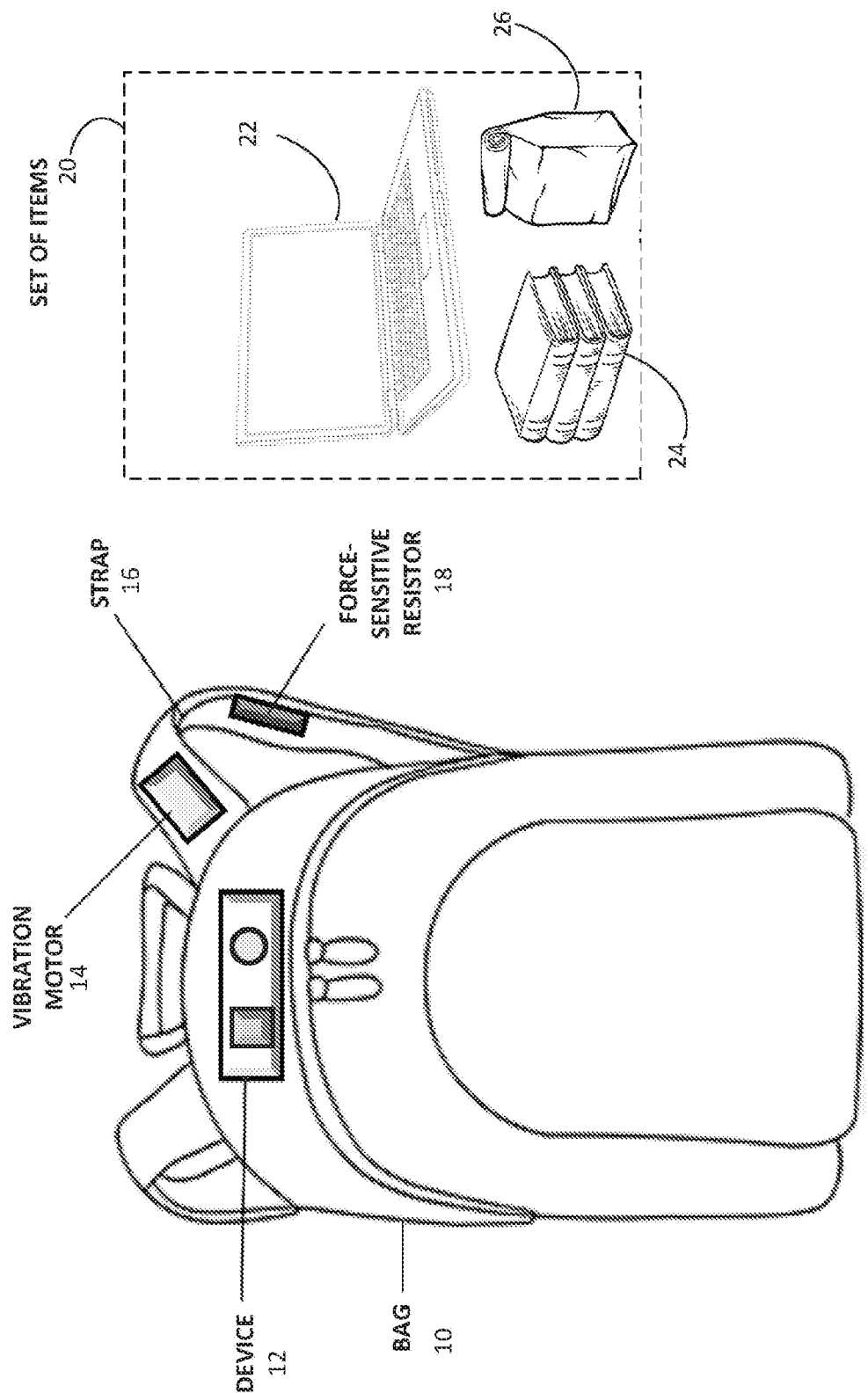
FIG. 1 is a general schematic diagram of a system for notifying a user of missing items from a set of items from a bag, the bag including a device, a vibration motor, and a force-sensitive resistor mounted on a strap of the bag.

FIG. 1 illustrates a bag 10 that may be implemented for example as a backpack, a handbag, a tote, a briefcase, a satchel, a laptop bag, or a travel bag. A device 12 is affixed to the bag 10 performs various performing and comparing various weight measurements and provides notifications to a user of missing items as described below in further detail. The bag 10 further includes a vibration motor 14 coupled to the device 12 for providing the notifications and a force-sensitive resistor 18 mounted on a strap 16 which may include a shoulder strap or handle, the force-sensitive resistor 18 coupled to the device 12 and functional to detect when the bag 10 is being carried by the user. The force-sensitive resistor 18 may be implemented using a piezo resistive sensor or equivalent. A set of items 20 may include a computer 22, books 24 and sack 26 as an illustration of the types of items that a user may typically carry in the bag 10. During the course of the day, various items from the set of items may be removed from and replaced back into the bag 10.

Figure 2:
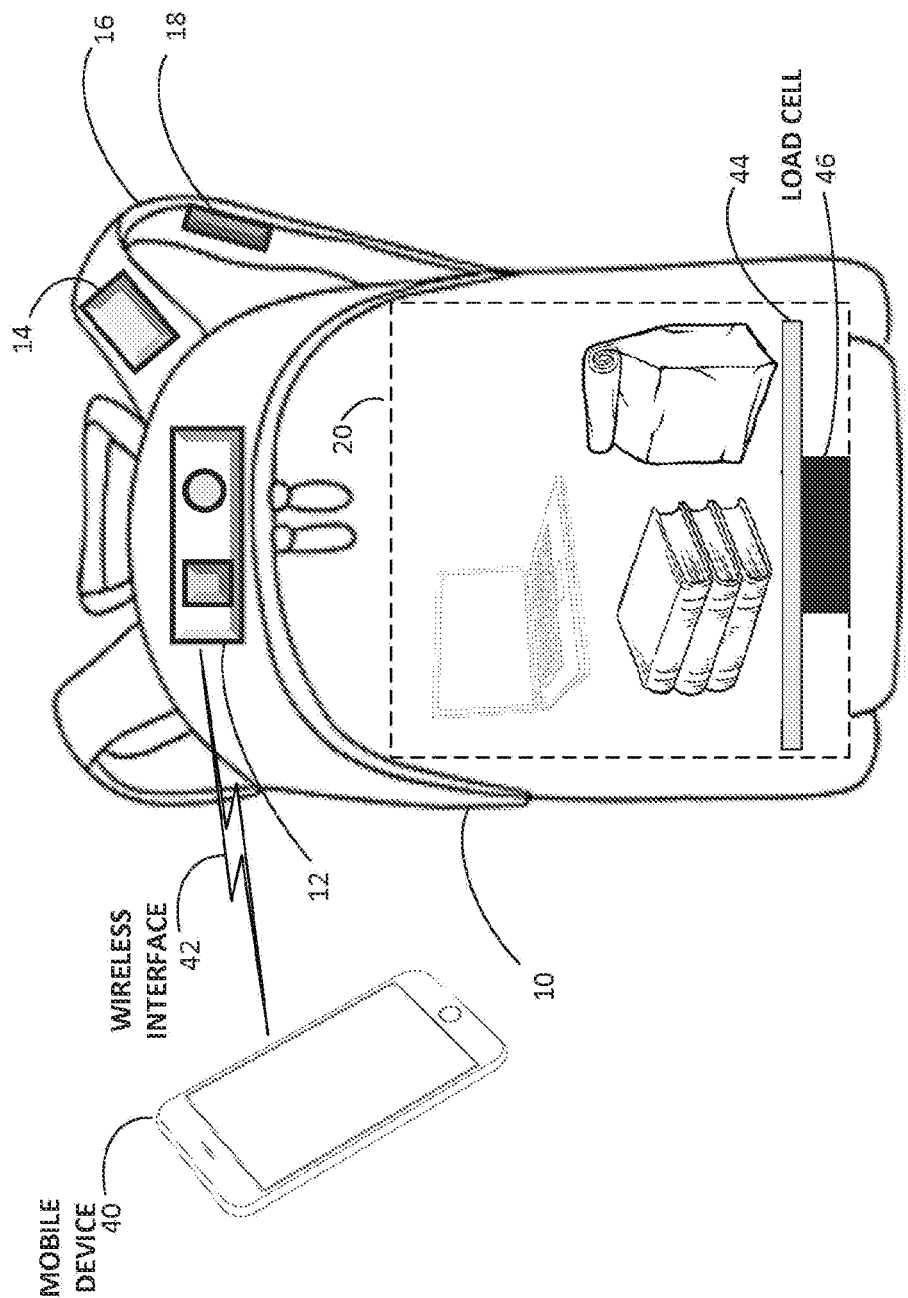
FIG. 2 is a general schematic diagram showing a cut-away view of the bag containing the set of items and further including a mobile device wirelessly coupled to the device and running a bag application program.

FIG. 2 illustrates a cutaway view of the bag 10 containing the set of items 20. The set of items 20 collectively reside on a platform 44, the platform 44 further residing on a load cell 46 that is operable to measure the weight of the set of items 20, the load cell 46 coupled to the device 12 to provide the weight measurements. A mobile device 40 that may include mobile phones, 'smartphones', tablet computers, and the like, is coupled to the device 12 via a wireless interface 42 that may implemented using any commonly available wireless standard communication protocol, such as Bluetooth, to provide data connectivity.

Figure 3:
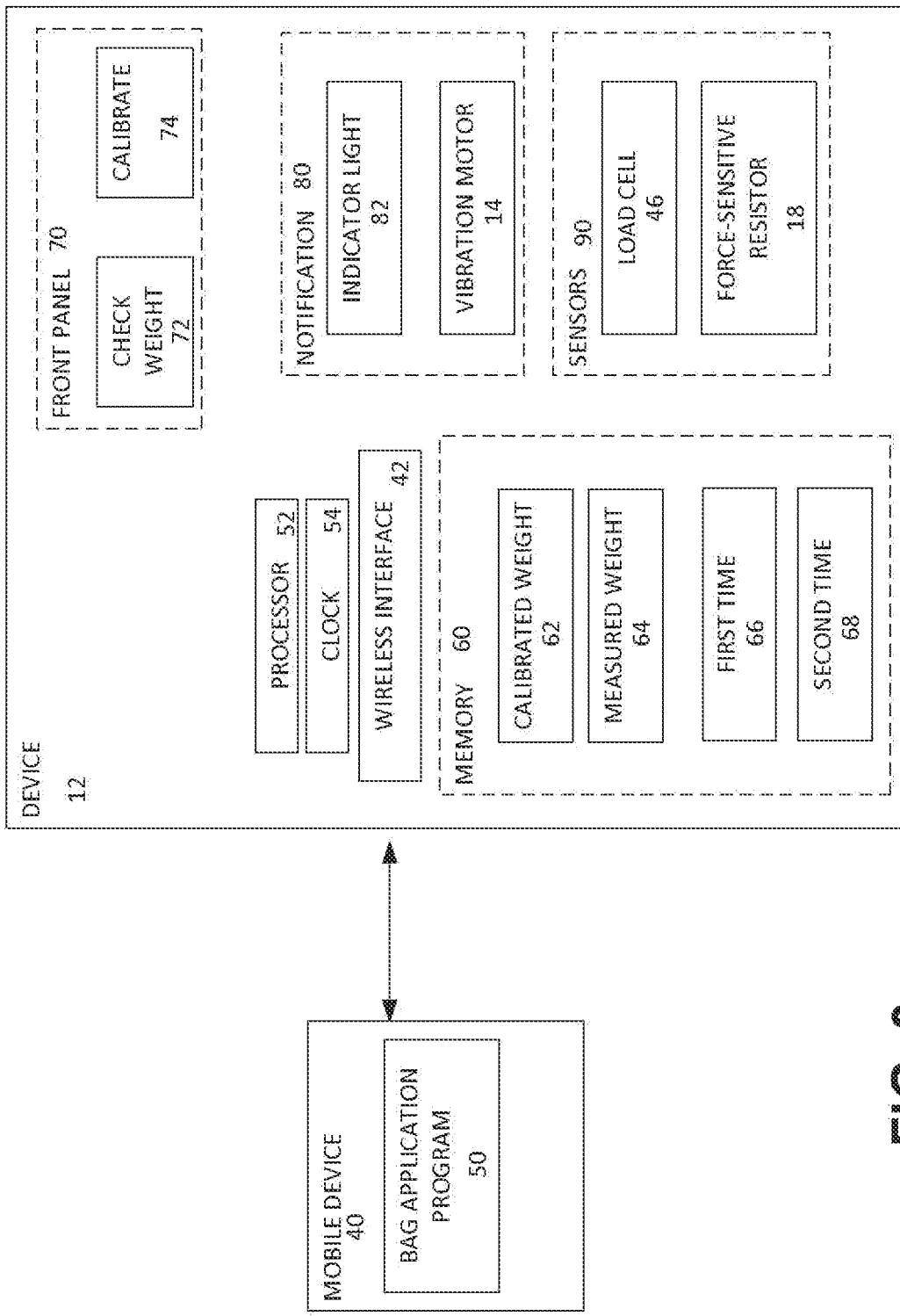
FIG. 3 is a block diagram of the system illustrating an example architecture of the device and the mobile device running the bag application program.

FIG. 3 illustrates a system level diagram of the device 12 in combination with the mobile device 40, the mobile device 40 further executing a bag application program 50, which may be in the form of an application program ('app') that is made available for download by the user to access and extend the functionality of the device 12. Operation of the device 12 according to the present invention does not require the presence of the mobile device 40. The device 12 includes a processor 52 which may include a single processor or a combination of processors as appropriate to execute program functions described in further detail below. A clock 54 provides for the current time. Memory 60 includes registers for storing and retrieving a calibrated weight 62, a measured weight 64, a first time 66, and a second time 68. A front panel 70 provides a user interface that includes a check weight button 72 and a calibrate button 74, with the buttons 72 and 74 operable to manually collect the measured weight 64 and the calibrated weight 62, respectively. A notification 80 may include vibrations from the vibration motor 14 that produces a mechanical vibration that may be felt by the user and a visual indication from an indicator light 82 wherein the indicator light produces colors e.g. selectable red-green-blue, or light sequences, e.g. flashing on/off at regular intervals, that are visible to the user. The notification 80 may include the light and vibrations, either individually or in combination, that are provided to the user. Sensors 90 include the load cell 46 for providing weight measurements of the set of items 20 and the force-sensitive resistor 18 that detects when the bag 10 is being carried or worn by the user.

Figure 4:
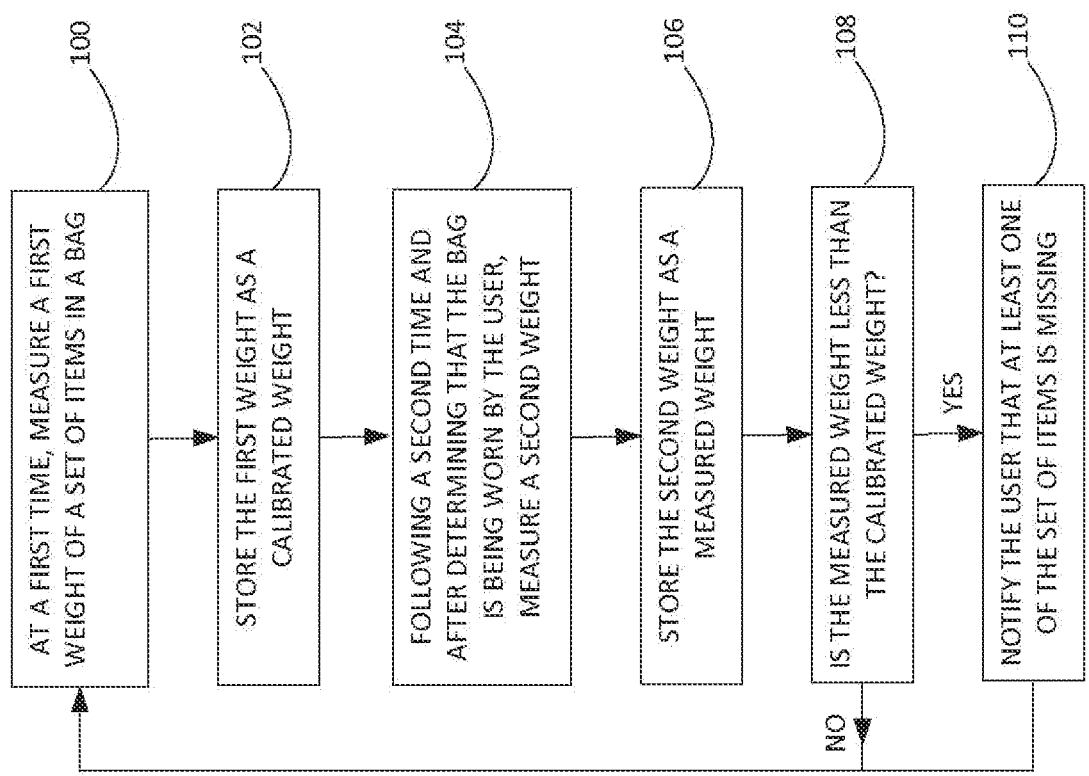
FIG. 4 is a flow diagram of the system illustrating measuring at a first time with a load cell a first weight of the set of items, storing the first weight as a calibrated weight, and following a second time after determining with a force-sensitive resistor that the bag is being worn by a user, measuring with the load cell a second weight of the set of items, storing the second weight as the measured weight, determining whether the measured weight is less than the calibrated weight, and if so, notifying the user that at least one of the set of items is missing.

FIG. 4 is a flow diagram illustrating the operation of the device 12. In step 100, at the first time 66 provided by the clock 54, a first weight of the set of items 20 is measured by the load cell 46. In step 102, the first weight is stored as the calibrated weight 62 in the memory 60. In step 104, following the second time 68 provided by the clock 54, and after detecting that the bag 12 is being carried or worn by the user according to the force-sensitive resistor 18, a second weight of the set of items 20 is measured by the load cell 46. In step 106, the second weight is stored as the measured weight 64 in the memory 60. In step 108, the measured weigh 64 is compared with the calibrated weight 62. If the measured weight 64 is equal to or greater than the calibrated weight 62, no notification is sent. In step 110, if the measured weight 64 is less than the calibrated weight 62, a notification from the notification 80 is sent to the user that indicates that at least one of the items of the set of items 20 is missing.

Figures 5A, 5B:
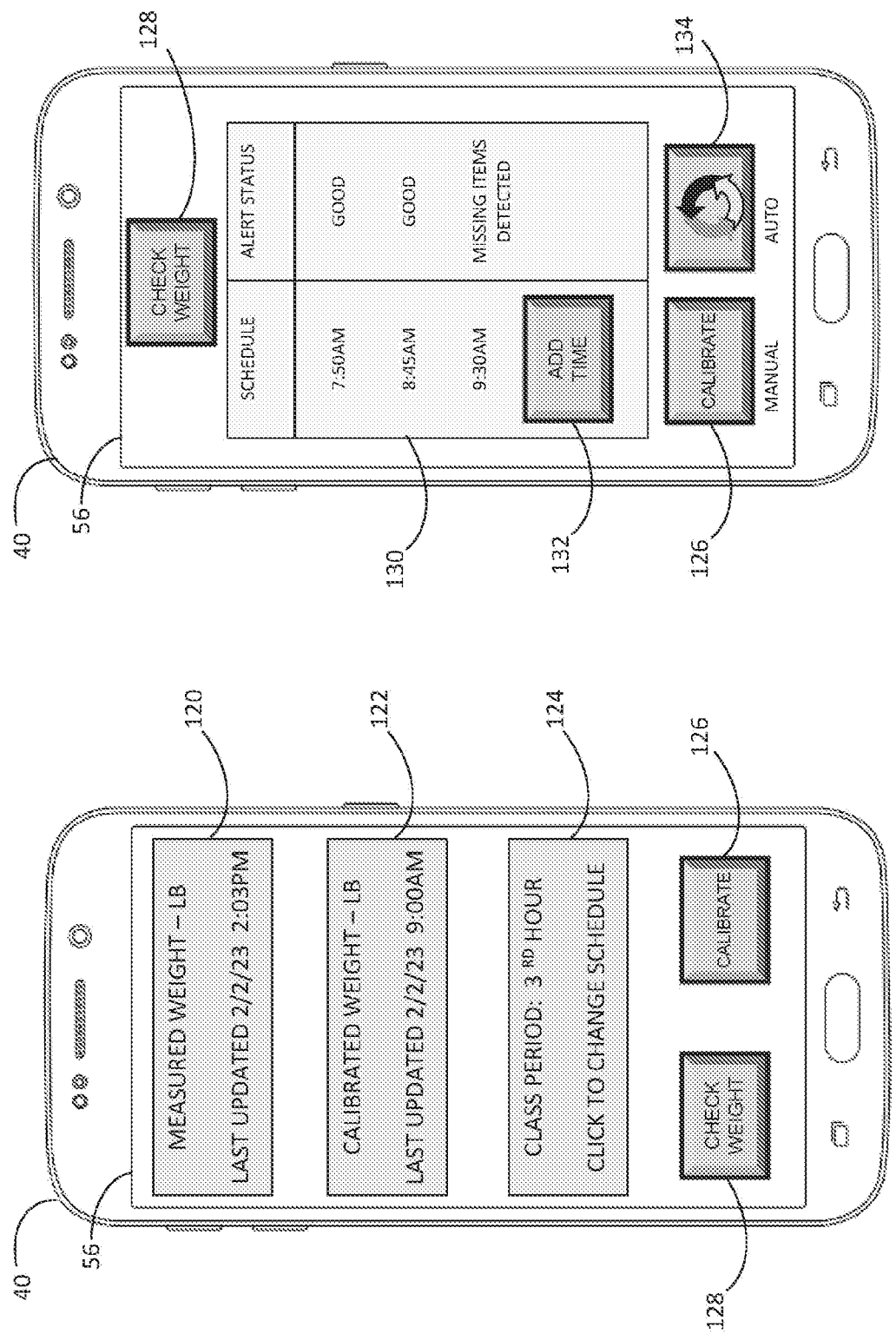
FIGS. 5A and 5B illustrate example user interface screens of the bag application program running on the mobile device in conjunction with the device to allow the user to obtain measured and calibrated weights and to enter a schedule that updates the first and second times on the device.

FIGS. 5A and 5B illustrate example user interface screens of the bag application program 50 running on the mobile device 40 having a display 56 and coupled via the wireless interface 42 to the device 12 to allow the user the ability to exercise additional functionality and ease of use with the device 12, the functionality including obtaining measured and calibrated weights and entering a daily schedule that updates the first and second times on the device.

FIG. 5A shows an example user interface screen of the bag application program 50 in an operating mode that includes a display area 120 that shows the current value of the measured weight 64 and a display area 122 that shows the current value of the calibrated weight 62, and dates and times when the measurements were last taken. The display area 124 shows a current scheduled location according to a class schedule or other similar meeting calendar that the user may have separately entered. Alternatively, the display area 124 may be configured to display a current time and location, such as from the mobile device 40 that may have current location data. Virtual buttons 126 and 128 may be programmed to perform the same function as the front panel buttons 72 and 74 described previously for CALIBRATE and CHECK WEIGHT.

FIG. 5B shows an example user interface screen of the bag application program 50 in a schedule mode. Display area 130 illustrates a class schedule with various schedule times during the day, e.g. 7:50 AM in the SCHEDULE column and a corresponding ALERT STATUS entry that shows the result of the comparison between the measured weight 64 and the calibrated weight 62 as described previously in steps 108 and 110. MISSING ITEMS DETECTED means than the alert 80 was sent to the user at the time indicated. The virtual buttons 126 and 128 appear as previously shown in FIG. 5A. Virtual button 134 labeled AUTO may be programmed so that the Steps 100-110 may be performed automatically according to the schedule. For example, steps 100 and 102 of FIG. 4 could be performed at the start time of a selected class or event, such as at 7:50 AM, and steps 104-110 could subsequently be performed on or after 8:45 AM, the stop time of the selected class and after the bag has been picked up as detected by the force-sensitive resistor 18. Virtual button 132 labeled ADD TIME allows for user programming of additional schedule entries. It will be understood that bag application program 50 could have the ability to import calendar data from other sources to simplify the task of creating the schedule such as with a sequence of class start times and stop times. In this way, the operation of the device 12 can be done in a more automated way to minimize unnecessary user interventions to initiate a weight measurement as well as reducing false notifications.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIG. 4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method, comprising:
   importing calendar data that includes a sequence of class start times and stop times associated with a class schedule;
   automatically measuring with a device a first weight of a set of items in a bag responsive to a first time in the sequence of the class start times;
   storing with the device the first weight as a calibrated weight;
   following a second time in the sequence of the class stop times and after determining with a force-sensitive resistor of the device that the bag is being worn by a user, automatically measuring with the device a second weight of the set of items;
   storing with the device the second weight as a measured weight;
   determining with the device whether the measured weight is less than the calibrated weight; and
   based on the determination that the measured weight is less than the calibrated weight, notifying with the device, the user that at least one of the set of items is missing.

2. The method of claim 1, wherein the device is attached to the bag.

3. The method of claim 1, wherein the device further comprises a vibration motor for notifying the user wherein the vibration motor produces a mechanical vibration that may be felt by the user.

4. The method of claim 1, wherein the device further comprises an indicator light for notifying the user wherein the indicator light produces light sequences visible to the user.

5. The method of claim 1, wherein the device includes a wireless interface, the wireless interface operable for connecting the device to a mobile device executing bag application software.

6. The method of claim 5, further comprising:
using the bag application software, setting the first time and the second time on the device.

7. The method of claim 5,
wherein importing of the calendar data is performed using the bag application software.

8. The method of claim 5 further comprising:
determining alert status entries associated with the sequence of class start times and stop times; and
using the bag application software, displaying the alert status entries along with the class schedule on the mobile device.

9. The method of claim 5 further comprising:
responsive to a calibrate input received from the user by the bag application software, measuring with the device the first weight; and
storing the first weight as the calibrated weight.

10. The method of claim 1, wherein the bag comprises one or more of a backpack, a handbag, a tote, a briefcase, a satchel, a laptop bag, or a travel bag.

11. The method of claim 1 wherein the force-sensitive resistor is coupled to a strap of the bag.

12. A system comprising a device coupled to a bag containing a set of items, further comprising:
a load cell in the bag;
a force-sensitive resistor coupled to a strap of the bag;
an indicator light;
a processor; and
a memory in communication with the processor, the memory comprising executable instructions that, when executed by, the processor, cause the data processing system to perform functions of:
importing calendar data that includes a sequence of class start times and stop times associated with a class schedule;
automatically measuring with the load cell the first weight of a set of items in a bag responsive to a first time in the sequence of the class start times;
storing in the memory the first weight as a calibrated weight;
following a second time in the sequence of the class stop times and after determining with the force-sensitive resistor that the bag is being worn by a user, automatically measuring with the load cell a second weight of the set of items;
storing in the memory the second weight as a measured weight;
determining whether the measured weight is less than the calibrated weight; and
based on the determination that the measured weight is less than the calibrated weight, notifying the user that at least one of the set of items is missing.

13. The system of claim 12 further comprising a vibration motor, the vibration motor providing vibrations to notify the user that at least one of the set of items is missing.

14. The system of claim 12 further comprising a mobile device running bag application software, the mobile device coupled to the bag device via a wireless interface, wherein the bag application software is operable to set the first time and the second time.

15. A system comprising a device coupled to a bag containing a set of items and a mobile device running bag application software, the mobile device coupled to the device via a wireless interface, further comprising:
a load cell in the bag;
a force-sensitive resistor coupled to a strap of the bag;
a processor; and
a memory of the mobile device in communication with the processor, the memory comprising executable instructions that, when executed by, the processor, cause the system to perform functions of:
using the bag application software, importing calendar data that includes a sequence of class start times and stop times associated with a class schedule;
setting a first time and a second time using the bag application software according to the sequence of the class start times and stop times associated with a class schedule;
automatically measuring with the load cell a first weight of a set of items in a bag responsive to the first time;
storing in the memory the first weight as a calibrated weight;
following the second time, the second time following the first time and after determining with the force-sensitive resistor that the bag is being worn by the user, measuring with the load cell a second weight of the set of items;
storing in the memory the second weight as a measured weight;
determining whether the measured weight is less than the calibrated weight;
based on the determination that the measured weight is less than the calibrated weight, notifying the user that at least one of the set of items is missing; and
using the bag application software, displaying an alert status entry in response to the notification of the user along with the class schedule on the mobile device.

* * * * *